United States Patent [19]

Sancinelli

[11] Patent Number: 5,221,512
[45] Date of Patent: Jun. 22, 1993

[54] APPARATUS FOR PREHEATING AND REMOVING ORGANIC MATERIALS FROM SCRAP IRON

[75] Inventor: Roberto Sancinelli, Bergamo, Italy

[73] Assignee: Blufin S.R.L., Italy

[21] Appl. No.: 705,732

[22] Filed: May 28, 1991

Related U.S. Application Data

[62] Division of Ser. No. 581,925, Sep. 13, 1990.

[30] Foreign Application Priority Data

Apr. 9, 1990 [IT] Italy ................................ 2920 A/90

[51] Int. Cl.$^5$ ............................................. C21D 11/00
[52] U.S. Cl. ....................................... 266/80; 266/83;
266/87; 266/89; 266/156; 266/157; 266/205;
266/901
[58] Field of Search ................. 266/80, 145, 160, 157,
266/901, 83, 87, 89, 156, 205

[56] References Cited

U.S. PATENT DOCUMENTS

| | | | |
|---|---|---|---|
| 2,943,930 | 7/1960 | Proler | 75/401 |
| 4,264,060 | 4/1981 | Twyman | 266/901 |
| 4,498,523 | 2/1985 | Bowman et al. | 75/401 |
| 4,548,651 | 10/1985 | Ramsey | 266/901 |
| 4,784,603 | 11/1988 | Robak, Jr. et al. | 266/44 |
| 4,889,556 | 12/1989 | Dighe | 75/10.22 |
| 5,059,116 | 10/1991 | Gillespie et al. | 266/901 |

FOREIGN PATENT DOCUMENTS 1497437  7/1989  U.S.S.R. .............................. 266/145

Primary Examiner—Melvyn J. Andrews
Attorney, Agent, or Firm—Steinberg & Raskin

[57] ABSTRACT

This method of preheating scrap iron mixed with plastic, rubber and resinous, i.e. organic, materials and intended for electric furnaces, in particular electric arc furnaces, is characterized by transforming the plastic, rubbery or resinous and like materials or organic nature present in the scrap iron, to advantageously eliminate them by a path able to produce thermal energy usable for preheating the scrap to be melted, said path consisting of pyrolysis in an environment fed both with the the scrap to be melted and with said organic materials, the whole being previously shredded.

14 Claims, 1 Drawing Sheet

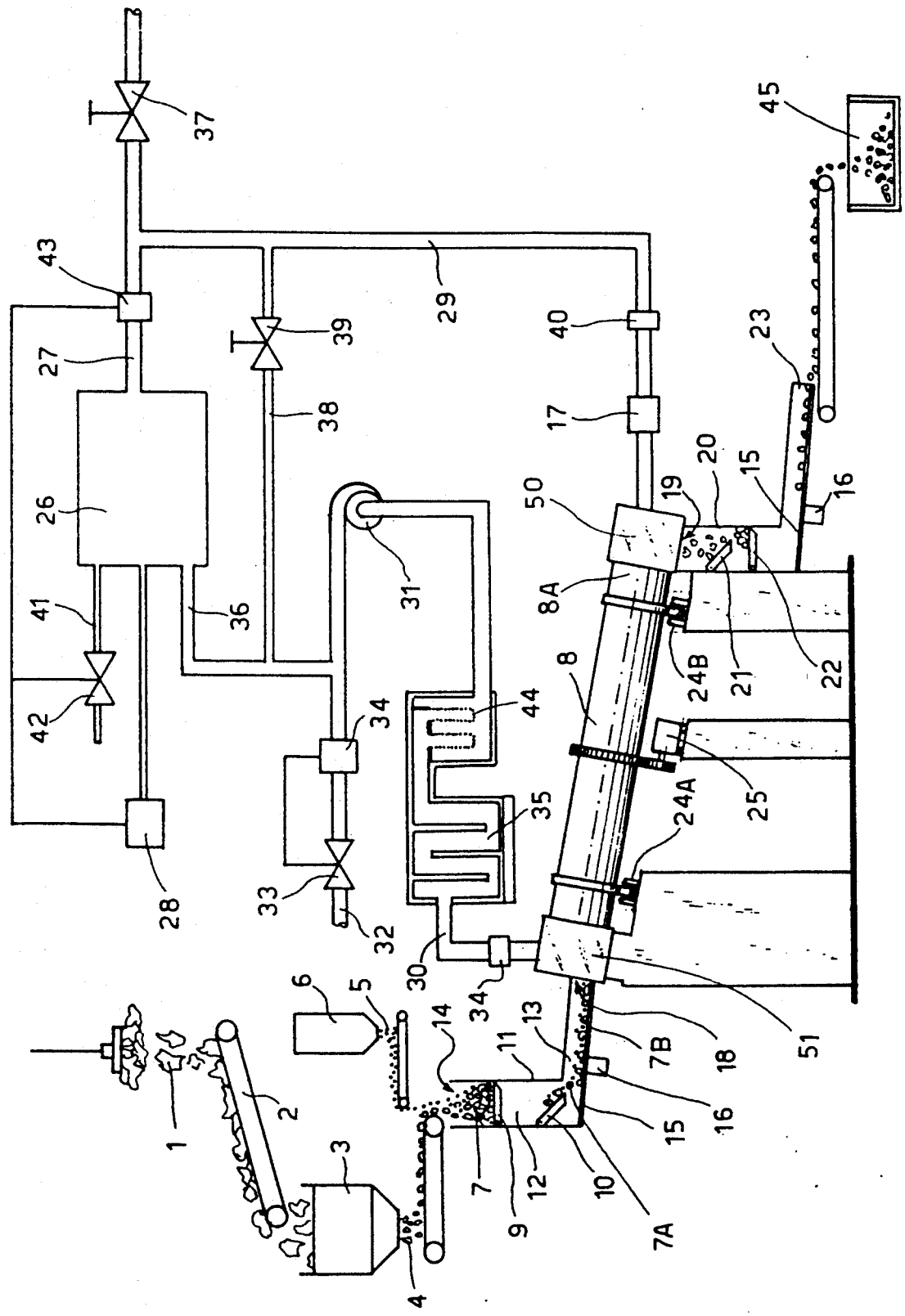

APPARATUS FOR PREHEATING AND REMOVING ORGANIC MATERIALS FROM SCRAP IRON

This is a division of application Ser. No. 07/581,925, filed Sep. 13, 1990.

DESCRIPTION

This invention relates to a method for preheating scrap iron intended for an electric arc furnace and containing fractions of material of organic nature such as plastic materials, rubbers, resins and the like. Scrap iron intended for the production of steel by an electric furnace mostly originates from the scrapping of vehicles, household electrical appliances and miscellaneous iron articles no longer used, and which contain organic material to the extent of about 25% of the total scrap. This scrap is currently size-reduced through suitable mills, this process separating the organic part from the metal part. This system enables the furnaces to be charged with clean material but has created a problem deriving from the accumulation of the organic material, which is difficult to dispose of. The resinous material can in the known art be subjected to a process of decomposition by pyrolysis or cracking. However, this known technology applies to organic material forming a high percentage of the treated mass in which the inorganic component, by representing only a negligible fraction, does not create separation problems because of the relative consistency of the composition.

The objects of the invention are:

to preheat all the necessary scrap iron to a particularly high temperature, without requiring the application of external energy;

to preheat all the necessary scrap iron without resulting in damage to, or abnormal wear of, auxiliary units of the production plant, such as bag filters;

to remove the resinous and the like materials present in the scrap iron in a cost-effective manner;

to effect this removal in an ecologically valid and safe manner;

to sue the energy content of said resinous material;

to produce steel of improved quality by eliminating from it those impurities deriving from the presence of slag of said organic material;

to reduce the residues of the decomposition process to carbon residues which can be used both for foaming the slag and for carburizing the steel;

to reduce the quantity of fumes produced and thus at the same time reduce both the electrical energy required for driving fans and the extent of the filtering means. These and further objects which will be apparent on reading the detailed description given hereinafter are attained by a method for preheating scrap iron intended for electric furnaces, particularly electric arc furnaces, characterized by transforming the organic materials present in the scrap iron, to advantageously eliminate them by a path able to produce thermal energy usable for preheating the scrap to be melted and which they accompany, said path consisting of pyrolysis in an environment fed with the scrap to be melted and with said organic materials, the whole being shredded before the pyrolysis.

BRIEF DESCRIPTION OF THE DRAWING

The drawing is a schematic representation of a plant suitable for carrying out the process of the present invention in which the various stages of the process are schematically illustrated.

DESCRIPTION OF PREFERRED EMBODIMENT

The present invention is further illustrated in the following description with reference to the drawing. With reference to said drawing, scrap iron 1 containing organic materials such as plastic materials, rubbers and the like, is fed by usual conveyor means 2, such as an endless conveyor, to a usual shredder 3 in which it is shredded into pieces 4 having a length of about 150–200 mm, which represents a compromise between the need for obtaining thorough homogenization of the components (requiring minimum size) and the need to form interconnected voids between the various pieces of shredded metal material to facilitate the passage through them of the gas provided for their heating (requiring maximum size). The starting material has very diverse origins, deriving from the scrapping of automobiles, motor buses, railway carriages, household electrical appliances and any other source. This material is associated with pieces of organic material such as resin, rubber and other materials, to a degree both qualitatively and quantitatively variable within wide limits. This material is intended to undergo herein a pyrolysis process (also known as cracking) such as to solve both the problem of its optimum elimination and at the same time the problem of preheating the metal, as the metal is simultaneously present. The pyrolysis process for demolishing the molecules of said organic materials takes place within a closed operating cycle. For proper operation of the pyrolysis accompanying the preheating, the variations in the organic and inorganic components should lie within experimentally determined values, so that it may prove advisable and in some cases necessary to supplement with other pieces 5 for organic material enrichment. The pieces 5, consisting of material with a high content of organic substances such as resin, rubber and other thermodegradable material content, can originate either from a previous sorting of the pieces 4 into two categories, i.e. high and low resin content material, or directly from specific stocks 6 of organic products 5 of any origin, not necessarily associated with an iron component. The need for this adjustment with resin-rich pieces 5 depends exclusively on the composition of the scrap 7 to be fed to pyrolysis. By way of example, the iron component of the scrap 7 must be between 60% and 90%, the remainder, i.e. between 40% and 10%, being organic products. The scrap 7 having its iron and organic component contents within said percentage ranges and having the stated piece size, is fed to a gasifier or special pyrolysis reactor 8. In this pyrolysis reactor, through which the pieces advance, the necessary heating of the organic substances (of lower heat transfer coefficient) derives from the heat more rapidly absorbed by the fragmented metal mass.

The well known greater heat conducting capacity of metals means that the mass to be thermally decomposed (in terms of its organic component) has a very advantageous heat distribution throughout its entire volume or mass. This is due not only to said heat conductivity of the iron, but also to the voids, the heterogeneousness and the solidity of form which the fragments of shredded scrap iron are able to offer to the passage of heating gas, which on the other hand the organic materials by thermally plasticizing would not allow if not involved in the random movement to which the material is subjected.

External heat sources consist of partially burnt recovered pyrolysis gas circulating in the direction opposite to that in which the material treated by the pyrolysis reactor moves. The pyrolysis must obviously take place in the absence of oxygen so as not to result in combustion but only in cracking of the organic molecules. For this reason the scrap 7 is fed to the pyrolysis reactor in such a manner as to ensure that the external air is isolated from the interior of the pyrolysis reactor. This can be achieved in various ways, of which that indicated schematically is merely one example. This method uses the usual double valve technique, consisting of two controlled mobile (e.g. rotatable) plates, i.e. an upper 9 and a lower 10, acting as valves. These valve plates are located within a duct 11 leading to the pyrolysis reactor 8, with usual means for sealing between the sections 12 and 13 and between the section 12 and the external environment 14, these being sections into which the valve plates 9 and 10 divide said duct 11.

The scrap 7 fed to pyrolysis is collected above the upper valve plate 9 until the required quantity is present, as determined by usual weighing means associated with means for controlling closure (the position indicated by 9 on the drawing) and opening (for example the position assumed by the lower plate 10). The upper valve plate 9 remains in its closed position while the lower valve plate 10 is in its open position, which creates continuity between the section 12 and the section 13. The open or oblique position indicated for the lower valve plate 10 allows the material 7B to fall onto an underlying inclined surface 15 provided with vibrator means 16 for providing vibration to cause it to advance or descend therealong until it enters the pyrolysis reactor 8 through a port 18. Thus after the valve plate 10 has allowed all the scrap 7A previously collected on it to fall onto the underlying inclined surface 15, the valve plate 10 rises to hermetically seal the duct 11, thus isolating the section 13 (in combustion with the interior of the pyrolysis reactor 8) from the section 12. At this point the valve plate 9 is opened to connect the section 12 to the external environment 14 and allow the feed scrap 7 heaped on it to fall onto the valve plate 10. This method therefore avoids the section 13 communicating with the external air 14. When the material 7B has passed through the port into the pyrolysis reactor, which basically consists of a tube with its axis inclined to the horizontal and rotating about said axis, it slowly advances towards exit apertures 19 situated at one end 8A of the pyrolysis reactor 8, and through which it leaves the pyrolysis reactor to fall into a duct 20. This duct is provided with a system comprising two controlled valve plates 21 and 22 similar to the already described plates 9 and 10 which control the entry of the material 7 into the pyrolysis reactor. The purpose of the system 21-22 is to prevent air entering the pyrolysis reactor 8 by passing firstly through the outward discharge aperture 23 and then through the duct 20. The pyrolysis reactor, which mechanically resembles rotary kilns for cement production, rotates slowly on bearing supports 24A, 24B and is driven by motor means 25. However, a fundamental difference is the substantial air-tightness of the pyrolysis reactor 8 towards the free or external environment. This air-tightness can be obtained by the double valve plate systems and, in the case of the described ducts, by various known methods, of which mention can be made by way of example of that based on labyrinth seals or the like, which are well known for connecting a rotary part to a static part. The inner walls of the pyrolysis reactor 8 are provided with radial blades or the like, the purpose of which is to prevent the iron and organic material packing together and to thus facilitate the stirring and movement of the material towards the aperture 19. It should incidentally be noted that both the inlet and the outlet of the pyrolysis reactor are located in stationary parts in which the rotary part of the pyrolysis reactor is supported. The speed at which the material moves towards the exit depends on a plurality of factors, the most fundamental of which is that the material must leave the aperture 19 only after all the organic material initially present in it has been usefully decomposed. The residence time of the material within the pyrolysis reactor 8 has therefore to be varied to obtain this result, either by means for varying its inclination or by means for adjusting its speed of rotation, or by adjusting the pyrolysis temperature. The first two method can obviously be achieved by known means. The preferable and advantageous adjustment of the pyrolysis temperature is however implemented in the following particular manner. Associated with the pyrolysis reactor there is a chamber 26 in which a gaseous hydrocarbon, preferably methane, originating from a source 28 is burnt. Controlled air also enters said chamber from a pipe 41 under the control of a valve 42. Both the air quantity and the methane quantity are controlled by a central control unit 43 which arranges for feeding the correct stoichiometric quantities, also obviously taking into account the presence of combustible gases of pyrolytic origin from the pyrolysis reactor 8. The burnt gas resulting from this combustion passes through a first pipe 27, from which it passes through a second pipe 29 to enter the stationary end 50 of the pyrolysis reactor. The very hot burnt gas entering the pyrolysis reactor rises along its interior to leave it (at the stationary end 51) through a third pipe 30 provided thereat. Said pipe 30 is connected to the suction side of a blower 31 which feeds it through a sixth pipe 36 to again enter the combustion chamber 26. Here it is further heated before again circulating through said pipes. The result is that the material contained in the pyrolysis reactor is heated, by which the material decomposes slowly into carbon, ash and volatile products. The generated pyrolysis products are the typical products of the pyrolysis of treated organic materials, i.e. $CO$, $H_2$, $CH_4$, $H_2O$, $CO_2$, $HCl$, $SO_2$ and $SO_3$. Of these gases the first three (carbon monoxide, hydrogen and methane) are known combustible gases and are therefore used for the production of the heat required for the pyrolysis, which initially, i.e. on plant start-up, is however totally provided from a source (methane from the plant 28) external to the cycle. As the pyrolytic process gradually goes to completion by virtue of the degradable material being retained at the temperature required for its break-down, said combustible gas gradually increases in quantity until it considerably exceeds the amount required for maintaining the pyrolytic cycle, so that not only does it no longer require the use of methane but becomes excessive to the point that it has to be deviated through a fifth pipe 32 which conveys it to other typical steelworks users or to storage means, this constituting a further advantage of the invention. This conveying is done after the gas has been filtered, analyzed and purified of its usual contained sulphur and chlorine by normal methods using carbonate dispersed in water. Initial filtration is by a usual static cyclone separator 35 in which solid carbon residues are deposited and can then be used in specific stages (such as slag foaming) of the steel production process (a further advantageous aspect of the invention). This initial filtration can be followed by a second finer filtration using bag filters 44. This second filtration may not be required, depending on qualitative and quantitative considerations. In this respect, pyrolysis of the resinous products eliminates the resinous matrix from the mentioned normal electric furnace fumes, so reducing both the substance to be filtered and its molecular complexity. The gas quantity fed to the other users 32 and that used for self-sustaining the pyrolytic process under the pumping action of the blower 31 is controlled by a usual control valve 33 controlled by an analyzer 34 on the basis of the flow and quantity parameters measured by it. Said analysis involves measuring the quantity of the various combustible gases, to ensure that the calorific power of their throughput is such as to self-sustain the process. The entire quantity exceeding this value is directed along the fifth pipe 32. The control valve 33 intervenes during the initial stages of the cycle, or when the combustible gas quantity produced by the pyrolysis is not excessive, or when it is insufficient to the extent of requiring the correcting intervention of auxiliary fuel gas from the plant 28. Under these conditions pressure increases can arise within the various recycle pipes, and these should be eliminated. This is achieved by a bleed valve 37 maintaining constant back pressure, which discharges the said now completely burnt gas which is in excess or otherwise is not to be readmitted to the pyrolytic cycle. The optimum temperature for implementing the pyrolytic process in the pyrolysis reactor 8 is within a range extending from about 750° to 900° K., so that such temperature must prevail notwithstanding any possible variation in the heat generated by the combustion of gas in the chamber 26. If the gas temperature in the second pipe 29 is insufficient then auxiliary gas from the source 28 must be burnt. If however the temperature is excessive it must be reduced by feeding said second pipe 29 with pyrolysis gas of lower temperature. This lower-temperature gas is conveyed by a seventh pipe 38 defining a by-pass to the pipe 27. This gas has in fact already undergone cooling by transferring heat to the scrap present in the pyrolysis reactor 8, and to the pipe 30, filter 35, filter 44 and blower 31. The quantity of "cold gas" fed by the seventh pipe 38 to the second pipe 29 is controlled by a valve 9 automatically controlled by temperature sensors 40 positioned close to the port (at the end 50) of the pyrolysis reactor 8. A modification, dictated by special requirements, could consist of positioning the bag filter 44 not only in series with the cyclone separator 35 but also, or indeed only, in series with the pipe 32 to the other combustible gas users. If the pyrolytic process is correctly functioning, an increase in the quantity of heating gas between the entry and exit of the pyrolysis reactor will occur, this increase being due to the partial conversion of resinous materials or the like into gas. Thus, by way of example, sensors for ascertaining whether the process is operating correctly can consist of usual flow indicators 17 and 34 positioned upstream and downstream of the pyrolysis reactor. These sensors can obviously automatically control the described correcting actions. Advantageously, said method enables preheating of the entire scrap requirement to be fed to the furnace. In a steelworks with a capacity for example of 85 t/h of steel, raising the scrap temperature by say 650° K. would result in a saving of 4.6 million Kcal/h, representing about 4,300 Italian lire per ton of steel produced. A further advantage is represented by the recovery of clean fuel gas to the extent of a volume of 200 $Nm^3$ of 5,500 $cal/Nm^3$ HCV per tonne of resinous material contained in the shredded scrap, i.e. per three tonnes of ferrous material. A further advantage is the recovery of powdered carbon residues from the filters. These residues can in fact be totally recycled to the electric furnace for preparation of the so-called "foam slag" (a recent known expedient which facilitates the formation of the actual slag). This operation and the steel recarburation currently consume up to 30 kg of ground carbon per tonne of steel, whereas with the pyrolytic method of the invention at least 30% more is made available. A further advantage of the production method of the invention is the elimination of the cost of disposal of the resinous components (plastic and the like) present in the scrap. A further advantage is the improvement in the fume filtration conditions, in that by virtue of the pyrolysis effected by the present method, the material with which the electric furnace is fed is completely free of resinous substances, so avoiding the considerable mass of powder and fumes which characterise the smelting cycles of the usual processes. The method of the invention therefore results in a reduction in fume extraction and filtration costs, to the extent of halving the electrical energy required for fume extraction and of using a smaller number of bag filters, which themselves will have a longer life.

I claim:

1. An apparatus for preheating and removing organic materials from scrap iron, comprising
   a shredder for shredding scrap iron containing organic materials, said shredder having an inlet and an outlet,
   a pyrolysis reactor for transferring heat to the organic materials to decompose them, said pyrolysis reactor having an inlet and an outlet,
   a material charging system having a first end arranged in proximity to said outlet of said shredder for receiving shredded scrap and having a second end connected to said inlet of said pyrolysis reactor, said material charging system adapted to feed shredded scrap to said pyrolysis reactor,
   said pyrolysis reactor having an interior and structured to feed shredded scrap iron through said interior in a first direction, said pyrolysis reactor having means adapted to feed hot gas through said interior counter-currently to said first direction such that pyrolysis products are generated from the organic materials,
   a material discharging system connected to said outlet of said pyrolysis reactor, said material charging and discharging system preventing any air continuity between said interior of said pyrolysis reactor and the external environment, and
   means for feeding a supplementary feed of resin and/or plastic and/or rubber-rich materials to said pyrolysis reactor for the purpose of restoring the optimum percentage of pyrolyzable component in the total material treated, said supplementary feed being controlled by means for measuring the difference in flow rates between said inlet and said outlet to said pyrolysis reactor, with compensation for the different gas temperatures in the two measurement regions, the excess amount consisting of gas originating from the recent pyrolysis.

2. The apparatus of claim 1, wherein said charging system and discharging system each comprise two valve plates, the opening of one being associated with the closure of the other.

3. The apparatus of claim 1 wherein said pyrolysis reactor comprises a rotatory cylinder arranged obliquely to provide axial movement of the shredded scrap through said inside of said pyrolysis reactor, and an internal blading assisting the axial movement of the material and stirring and disaggregating the material.

4. The apparatus of claim 1 further comprising a source of gaseous fuel comprising a combustion chamber connected to a stationary end of said pyrolysis reactor located in proximity to said outlet of said pyrolysis reactor.

5. The apparatus of claim 4 further comprising conduit means for removing and recirculating the pyrolysis products generated in said pyrolysis reactor to said source of gaseous fuel, said conduit means including a by-pass to said combustion chamber for downwardly adjusting the temperature of the gas conveyed to the pyrolysis reactor.

6. The apparatus of claim 5 wherein said source of gaseous fuel further comprises control means for controlling the flow of air and/or of combustible gas to be burnt within said combustion chamber, said combustion chamber having an outlet connected to said stationary end of said pyrolysis reactor, said control means being positioned at said outlet of said chamber for analyzing the resultant gases.

7. The apparatus of claim 6, further comprising a bleed valve for the gas from said combustion chamber located downstream from said control means, said bleed valve controlling the pressure within said conduit means and said source of gaseous fuel, and a control valve connected to said conduit means located upstream from said combustion chamber, said control valve controlling the quantity of combustible gas used for other external purposes on the basis of the weight availability of said gas.

8. The apparatus of claim 2, wherein said material charging means further comprises a non-horizontal surface onto which shredded material finally falls, prior to entering said pyrolysis reactor.

9. The apparatus of claim 5 wherein said conduit means comprises a filter system for the pyrolysis products produced in said pyrolysis reactor, said filter system comprising a static cyclone separator adapted to collect useful carbon products from the pyrolysis products.

10. An apparatus for preheating and removing organic materials from scrap iron, comprising
- a shredder for shredding scrap iron containing organic materials, said shredder having an inlet and an outlet,
- a pyrolysis reactor for transferring heat to the organic materials to decompose them, said pyrolysis reactor having an inlet and an outlet,
- a material charging system having a first end arranged in proximity to said outlet of said shredder for receiving shredded scrap and having a second end connected to said inlet of said pyrolysis reactor, said material charging system adapted to feed shredded scrap to said pyrolysis reactor,
- said pyrolysis reactor having an interior and structured to feed shredded scrap iron through said interior in a first direction, said pyrolysis reactor having means adapted to feed hot gas through said interior counter-currently to said first direction such that pyrolysis products are generated from the organic materials,
- a material discharging system connected to said outlet of said pyrolysis reactor, said material charging and discharging system preventing any air continuity between said interior of said pyrolysis reactor and the external environment,
- a source of gaseous fuel comprising a combustion chamber connected to a stationary end of said pyrolysis reactor located in proximity to said outlet of said pyrolysis reactor, and
- conduit means for removing and recirculating the pyrolysis products generated in said pyrolysis reactor to said source of gaseous fuel, said conduit means including a by-pass to said combustion chamber for downwardly adjusting the temperature of the gas conveyed to the pyrolysis reactor.

11. The apparatus of claim 10, wherein said source of gaseous fuel further comprises control means for controlling the flow of air and/or of combustible gas to be burnt within said combustion chamber, said combustion chamber having an outlet connected to said stationary end of said pyrolysis reactor, said control means being positioned at said outlet of said chamber for analyzing the resultant gases.

12. The apparatus of claim 11, further comprising a bleed valve for the gas from said combustion chamber located downstream from said control means, said bleed valve controlling the pressure within said conduit means and said source of gaseous fuel, and a control valve connected to said conduit means located upstream from said combustion chamber, said control valve controlling the quantity of combustible gas used for other external purposes on the basis of the weight availability of said gas.

13. The apparatus of claim 10, wherein said conduit means comprises a filter system for the pyrolysis products produced in said pyrolysis reactor, said filter system comprising a static cyclone separator adapted to collect useful carbon products from the pyrolysis products.

14. The apparatus of claim 10, wherein said charging system and discharging system each comprise two valve plates, the opening of one being associated with the closure of the other, said material charging means further comprising a non-horizontal surface onto which shredded material finally falls, prior to entering said pyrolysis reactor.

* * * * *